US006355754B1

(12) United States Patent
Olson et al.

(10) Patent No.: US 6,355,754 B1
(45) Date of Patent: *Mar. 12, 2002

(54) HIGH REFRACTIVE INDEX CHEMICAL COMPOSITION AND POLYMERS AND POLYMERIC MATERIAL DERIVED THEREFROM

(75) Inventors: David B. Olson, May Township; Bettie C. Fong, Woodbury, both of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,995

(22) Filed: May 9, 1997

(51) Int. Cl.[7] .................................. C08F 20/18
(52) U.S. Cl. ..................... 526/296; 526/292.5
(58) Field of Search ............. 526/296, 292.5

(56) References Cited

U.S. PATENT DOCUMENTS

| | | | |
|---|---|---|---|
| 3,817,913 A | * 6/1974 | Gaenzler | 526/292.3 |
| 3,845,102 A | 10/1974 | Higuchi et al. | |
| 4,542,449 A | 9/1985 | Whitehead | |
| 4,568,445 A | 2/1986 | Cates et al. | |
| 4,578,445 A | 3/1986 | Sakagami et al. | 526/292.3 |
| 4,721,377 A | 1/1988 | Fukuda et al. | |
| 4,803,140 A | 2/1989 | Hiro | 430/58 |
| 4,812,032 A | 3/1989 | Fukuda et al. | |
| 4,871,819 A | 10/1989 | Oonishi et al. | 526/245 |
| 4,970,135 A | 11/1990 | Kushi et al. | 430/280 |
| 5,175,030 A | 12/1992 | Lu et al. | 428/30 |
| 5,183,597 A | 2/1993 | Lu et al. | |
| 5,183,870 A | 2/1993 | Fukushima et al. | 526/273 |
| 5,331,073 A | 7/1994 | Weinschenk, III et al. | 526/265 |
| 5,359,021 A | 10/1994 | Weinschenk, III et al. | 526/264 |
| 5,394,255 A | 2/1995 | Yokota et al. | |
| 5,424,339 A | 6/1995 | Zanka et al. | 522/168 |
| 5,486,949 A | 1/1996 | Schrenk et al. | |
| 5,552,907 A | 9/1996 | Yokota et al. | |
| 5,591,527 A | 1/1997 | Lu | 428/411.1 |
| 5,592,332 A | 1/1997 | Nishio et al. | |
| 5,598,280 A | 1/1997 | Nishio et al. | |
| 6,107,364 A | 8/2000 | Fong et al. | |

FOREIGN PATENT DOCUMENTS

| | | | |
|---|---|---|---|
| DE | 40 10 783 A1 | 4/1990 | |
| DE | 40 10 783 | 10/1991 | C08F/220/30 |
| DE | 40 10 783 A1 | 10/1991 | C08F/220/30 |
| EP | 0 162 550 A2 | 11/1985 | |
| EP | 0 176 874 A2 | 4/1986 | |
| EP | 0 267 459 | 5/1988 | C08F/2/02 |
| EP | 0 267 460 | 5/1988 | C08F/220/22 |
| EP | 0 357 039 B1 | 3/1990 | |
| GB | 2 089 523 | 6/1982 | |
| GB | 2 089 523 A | 6/1982 | |
| JP | 61-286347 | 12/1986 | C07C/69/353 |
| JP | 62-30174 | 2/1987 | C09J/3/14 |
| JP | 1-50689 | 10/1989 | C07C/69/54 |
| JP | 3-23404 | 1/1991 | G02B/5/30 |
| JP | 03-153715 | 7/1991 | C08F/220/14 |
| JP | 04-285654 | 10/1992 | C08L/33/12 |
| JP | 6-123856 | 5/1994 | G02C/7/00 |
| JP | 6-86408 | 11/1994 | C07C/69/54 |

OTHER PUBLICATIONS

CA 112:21346 (J. Polym. SCI, Part A), 1989.*
CA 116: 48963 (JP03123357A2), May 27, 1991.*
Yang et al., "Syntheses of 4–Methacryloxy–2,3,5,6–tetrabromobenzyl Phosphonates and Effects of Flame Retardancy on Their Co–PMMA," Journal of Polymer Science: Part A: Polymer Chemistry, vol. 27, pp. 3551–3567 (1989).
CA 107: 155785.*
Kirk–Othmer Encyclopedia of Chemical Technology, vol. 4, 543 (4$^{th}$ ed., 1992).
Kirk–Othmer Encyclopdia of Chemical Technology, vol. 9, 769 (4$^{th}$ ed., 1992).

* cited by examiner

Primary Examiner—Christopher Henderson
(74) Attorney, Agent, or Firm—Bruce E. Black

(57) ABSTRACT

Described are a polymerizable composition comprising an alkyl-substituted brominated phenolic ester (meth)acrylate monomer having an index of refraction of at least 1.50, and, polymeric materials derived therefrom.

4 Claims, No Drawings

US 6,355,754 B1

HIGH REFRACTIVE INDEX CHEMICAL COMPOSITION AND POLYMERS AND POLYMERIC MATERIAL DERIVED THEREFROM

FIELD OF THE INVENTION

The invention relates to polymerizable compositions containing high index of refraction monomers, and polymeric materials prepared therefrom.

BACKGROUND

Optical materials and optical products can be prepared from high index of refraction materials such as polymerizable, high index of refraction monomers and curable compositions containing such high index of refraction monomers. An example of useful high index of refraction monomers are bromine-substituted aromatic (meth)acrylate monomers. See for example U.S. Pat. No. 4,578,445. Such monomers can typically be relatively high melting materials that exist in the form of a solid at or around room temperature, and often have melting points significantly above room temperature. Because these monomers exist as solids at room temperature, curable compositions containing these monomers must either be dissolved into solution, or heated to their melting points (above room temperature) to be processed and formed into a high index of refraction optical product.

The need to heat high index of refraction materials during processing adds significant complication and expense to the processing of the material into an optical product. Processing lines must be heated, which can require large amounts of energy, can sometimes rupture tubing connections, and can even cause the evolution of volatile organic compounds, thereby potentially creating a hazardous work environment. If complete and uniform heating is not consistently maintained, the monomer can crystallize within the curable composition during processing, resulting in the production of non-uniform and unusable product, and resulting in high amounts of waste product. And, maintaining the polymerizable composition at an appropriate processing temperature can potentially cause prepolymerization of the monomeric composition. Of course, all of these added process requirements and negative consequences increase the cost of producing high index of refraction products from curable compositions that exist as solids at room temperature.

It would be advantageous to identify a polymerizable composition useful to produce optical materials and optical products having a relatively high index of refraction, and a relatively low melting point, e.g., a polymerizable composition that can be processed as a liquid at temperatures equal to or near normal room temperature.

SUMMARY OF THE INVENTION

In a general sense, the present invention provides polymerizable compositions having a high index of refraction, and preferably, high index of refraction polymerizable compositions that can be processed at temperatures at or near room temperature (e.g., in the range from about 20 to 25° C.) to produce a polymer or polymeric material. The polymerizable composition contains brominated, high index of refraction monomers. The monomer and the composition can each have relatively low melting points, and desirable optical properties.

Monomers useful in the composition include alkyl-substituted brominated phenolic (meth)acrylate monomers that have relatively high indexes of refraction, and that can preferably be liquid at temperatures between near room temperature and 60° C. Even those brominated monomers that are solids in this temperature range can be desired because these can often be easily dissolved in liquid polymerizable compositions of the present invention without significantly raising the melting point of the polymerizable composition. Thus, a polymerizable composition containing these monomers can preferably have a relatively low melting point, and can more preferably exist in the form of a liquid at temperatures at or around room temperature, thereby reducing or eliminating the need to heat these compositions during processing. The invention thereby eliminates expense and complication otherwise associated with heating a polymerizable composition to prepare high index of refraction polymeric materials. By "processing," it is meant that the monomer or polymerizable composition can be blended, pumped, or otherwise handled prior to polymerization and manufacturing to produce a polymer or optical product.

An aspect of the invention relates to a polymerizable composition containing an alkyl-substituted brominated aromatic ester (meth)acrylate monomer, the brominated monomer preferably having an index of refraction of at least 1.50. The polymerizable composition further contains one or more comonomer or comonomers, including at least one high index of refraction comonomer.

Yet another aspect of the invention relates to polymer or polymeric material comprising monomeric units derived from the above-described polymerizable composition. Specifically, the invention relates to a polymer or polymeric material derived from ingredients including an alkyl-substituted brominated aromatic ester (meth)acrylate monomer, the brominated monomer preferably having an index of refraction of at least 1.50, and one or more comonomer or comonomers, including at least one high index of refraction comonomer.

As used within the present description.

"Monomer" refers to a monomer on an individual scale, and also refers collectively to a composition of such monomers on a macroscopic scale such that the composition can be described as having a physical state of matter (e.g., liquid, solid, etc.) and physical properties (e.g., melting point, viscosity, glass transition temperature (of a polymeric form of the monomer), or refractive index).

"Melting point," as used with respect to the monomer, refers to the temperature at which the monomer passes from a solid to a liquid state, as measured at atmospheric pressure. Melting point can be measured, for example, using a Thomas-Hoover Melting Point Apparatus, from Thomas Scientific of Swedesboro N.J.

"Index of refraction," or "refractive index," refers to the absolute refractive index of a material (e.g., a monomer) which is understood to be the ratio of the speed of electromagnetic radiation in free space to the speed of the radiation in that material, with the radiation being sodium yellow light at a wavelength of about 583.9 nm. Index of refraction can be measured using an Abbe Refractometer.

(Meth)acrylate refers to both acrylate and methacrylate compounds.

DETAILED DESCRIPTION

The present invention describes a polymerizable composition comprising an alkyl-substituted brominated phenolic ester (meth)acrylate monomer. As used within the present description the term "polymerizable" refers to a chemical molecule such as a monomer or oligomer, etc., or a chemical composition, capable of polymerizing or copolymerizing (e.g., via unsaturated moieties) to produce a higher molecular weight material such as a polymer or polymeric material. "Polymer" or "polymeric material" are used interchangeably to refer to materials prepared from the reaction of one or more unsaturated materials, e.g., one or more monomer, oligomer, or polymer, prepolymer, etc., and includes, e.g., dimers, trimers, oligomers, pre-polymers, copolymers, homopolymers, etc.

The alkyl-substituted brominated aromatic ester (meth) acrylate monomer, also preferred to herein as "the Monomer," or the "Brominated Monomer," preferably has physical properties that allow processing of the composition at or near room temperature to produce a high index of refraction optical product. Thus, the Brominated Monomer has a relatively high index of refraction, and preferably has a relatively low melting point.

The substituents of the aromatic portion of the Monomer can affect or substantially determine the physical properties of the Monomer, including index of refraction and melting point. These properties are believed to be affected by the chemical composition of the substituents, the size and number of such substituents, and the location of such substituents on the monomeric structure, e.g., on the aromatic portion of the Monomer. While wishing not to be bound by theory, the alkyl substituent (e.g., its size, position, and chemical composition) is believed to affect the melting point of the Monomer. Further, the position of the alkyl group on the aromatic portion of the Monomer can affect the size of the alkyl group required to provide a desired physical property such as melting point. That is, preferred alkyl groups in the para position that provide a desired melting point or index of refraction may be of a size range different from preferred alkyl groups in the meta or ortho positions that also provide the desired property. Preferably, the alkyl group has a chemical composition and position such that the Monomer has a melting point below about 60° C., more preferably below about 35° C. or 30° C., even more preferably below about 25° C., and most preferably the Monomer exists in a liquid state at about 23° C.

A property related to melting point of the Monomer is viscosity. The Monomers of the present invention preferably are of a viscosity (at 23° C.) that allows the Monomer or a polymerizable composition comprising the Monomer to be processed at room temperature (without heating) to produce a high index of refraction polymer or polymeric material. Although viscosities outside of these ranges can also be useful, preferred viscosities of the Monomer can be below about 10,000 cps, for example in the range from about 100 to 5000 centipoise (cps), more preferably from about 300 to 4000 cps. Viscosity can be measured by known methods, for example using a viscometer such as a Brookfield viscometer.

The chemical composition and position of the alkyl on the aromatic ring can also tend to affect the index of refraction of the Monomer. Thus, while wishing not to be bound by theory, and while observing that Monomers having relatively larger alkyl groups can be useful within the present invention, it can be said that in a very general sense larger alkyl groups can result in a lower index of refraction.

The index of refraction of the Monomer can also be affected by the presence and position of bromine on the monomer. It is generally understood that the presence of bromine increases the index of refraction of the Monomer. Bromine can be present on the monomer at any useful position and in any amount to provide a Monomer having one or more of the above-described desired physical properties. Preferably, the Brominated Monomer has bromine attached in a sufficient amount and at appropriate positions to produce a monomer having an index of refraction of at least 1.50, more preferably at least 1.55, or 1.56. This can be accomplished, for example, by having at least two bromines directly attached to the aromatic portion of the Monomer. Often, the position of the bromine can be a function of the materials and process used to prepare the Brominated Monomer (described infra). Also, the position of the bromine can depend at least in part on the position of the alkyl. If the alkyl is attached at the 4 position relative to the ester substituent, bromines are preferably at the 2 and 6 position, and, if the alkyl is at the 2 position, bromines are preferably at the 4 and 6 positions.

Examples of Brominated Monomers useful in the practice of the invention include alkyl-substituted brominated aromatic ester (meth)acrylate monomers of general formula:

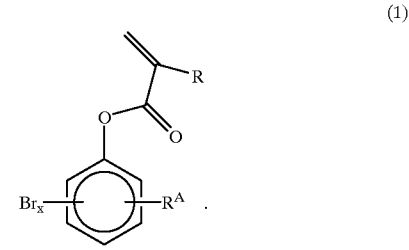

(1)

In formula 1, R can be hydrogen (—H) or methyl (—CH$_3$), R$^A$ can be a straight or branched alkyl preferably having from 1 to 18 carbon atoms, and x can be in the range from about 1 to 4, with the combination of these variables preferably being such that the brominated monomer has an index of refraction of at least 1.50. R$^A$ can be positioned ortho, meta, or para to the ester.

A particularly preferred class of Brominated Monomer are those comprising an aromatic portion substituted with an alkyl at the position ortho to the ester substituent:

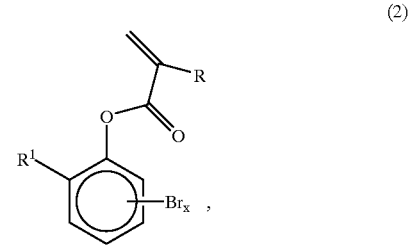

(2)

In FIG. 2, R and x are as defined with reference to FIG. 1, and R$^1$ is an alkyl according to R$^A$. Preferably, R$^1$ can be an alkyl group to provide a monomer having an index of refraction of at least 1.50, e.g., an alkyl group having from about 1 to 18 carbon atoms, more preferably from about 3 to 12 carbon atoms. Also preferably, the Monomer can have at least two bromines attached directly to the aromatic ring. In a particularly preferred embodiment of this Monomer bromines are located at the 4 and 6 positions on the aromatic ring, ortho and para to the ester substituent:

(3)

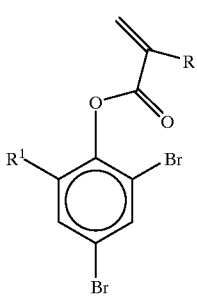

Particular Monomers according to formula 3 include 4,6-dibromo-2-alkyl phenolic ester (meth)acrylates, wherein the alkyl ($R^1$) has from 3 to 12 carbons, for example from 3 to 4 carbon atoms. Examples of such Monomers include the following:

4,6-dibromo-2-sec-butyl phenyl (meth)acrylate:

(3.1)

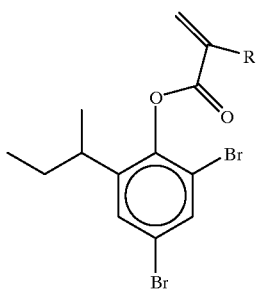

4,6-dibromo-2-tert-butyl phenyl (meth)acrylate:

(3.2)

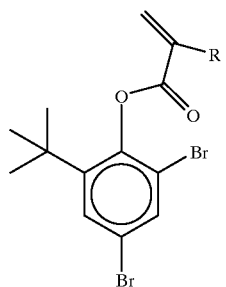

4,6-dibromo-2-isopropyl phenyl (meth)acrylate:

(3.3)

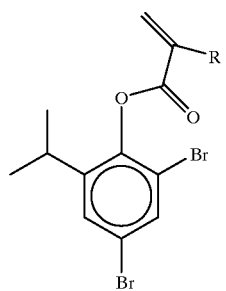

A second particularly preferred class of Brominated Monomer comprises an aromatic portion substituted with an alkyl group at the position para to the ester substituent:

(4)

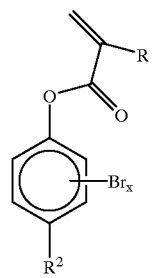

In FIG. 4, R and x are as defined with reference to FIG. 1, and $R^2$ is an alkyl such as $R^A$. Preferably, $R^2$ can be an alkyl group to provide a Monomer having an index of refraction of at least 1.50, e.g., an alkyl group having from about 1 to 18 carbon atoms, more preferably from about 3 to 12 atoms. Also preferably, the Monomer can have at least two bromines attached directly to the aromatic ring. In a particularly preferred embodiment of this Monomer, bromines are located at the 2 and 6 positions on the aromatic ring, each being ortho to the ester substituent:

(5)

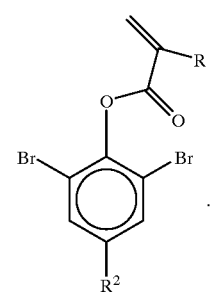

One particularly preferred para-substituted alkyl group is nonyl, giving dibrominated-4-nonyl phenyl (meth)acrylate monomers, such as 2,6-dibromo-4-nonyl phenyl (meth)acrylate:

(6)

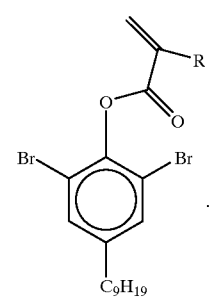

Another particularly preferred para-substituted alkyl group is dodecyl, giving dibrominated-4-dodecyl phenyl (meth) acrylate monomers, such as 2,6-dibromo-4-dodecyl phenyl (meth)acrylate:

(7)

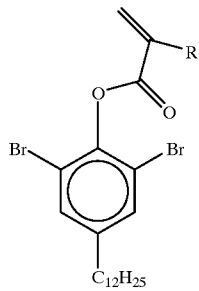

The Brominated Monomers can be prepared by any method generally useful in preparing brominated phenolic compounds, and in particular alkyl-substituted brominated phenolic ester (meth)acrylates. Such methods are well known in the chemical art. By one particular method, an alkyl-substituted phenol can be brominated to produce a brominated alkylphenol. Alkylphenols are commercially available, for example, from Schenectady International, Inc., Chemical Division, Schenectady N.Y. Such alkyl-substituted phenols can be brominated by methods that are generally known in the chemical art, and are described, for example, in the Kirk-Othmer Encyclopedia of Chemical Technology, volume 4, 543 (4$^{th}$ ed. 1992). An example of such a process, show with respect to an ortho-substituted alkylphenol, is as follows:

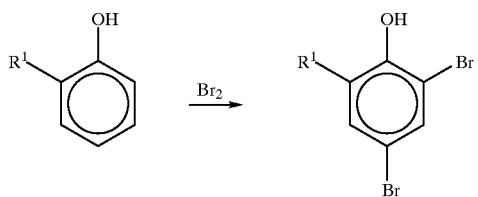

In a second step of this method, the brominated alkylphenol can be esterified to produce an alkyl-substituted brominated phenolic ester (meth)acrylate, by reaction with an appropriate acid chloride. The reaction between an alcohol and an acid chloride is well known in the chemical art, and is described, for example, in the Kirk-Othmer, Encyclopedia of Chemical Technology, volume 9, 769 (4$^{th}$ ed. 1992; see also U.S. Pat. No. 3,845,102). Inhibitors, such as phenothiazine or 4-methoxyphenol (MEHQ), can be used in such an amount to provide protection from pre-polymerization of the Monomer during its synthesis and storage, while not excessively influencing the subsequent polymerization. With respect to the Monomer of the present invention, the brominated alkylphenol can be reacted with (meth)acryloyl chloride as shown:

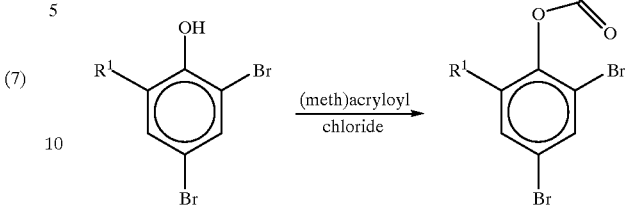

The Brominated Monomer can be used alone or in combination with one or more comonomers or high index of refraction comonomers to prepare a polymerizable composition that can be polymerized or copolymerized to produce useful polymers or polymeric or copolymeric materials. As will be apparent in light of the various examples below, the molecular weight of a comonomer can be within a large useful range. As used within the present description the term "comonomer" can refer not only to those materials generally known in the chemical art as "monomers," but also to relatively higher molecular weight materials including materials comprising polymerizable oligomers, and also relatively higher molecular weight materials such as polymerizable pre-polymers and polymerizable polymers. Preferably, a high index of refraction monomer will have an index of refraction of at least about 1.50.

The comonomer can comprise any of a number of known and useful polymerizable unsaturated moieties, e.g., vinyl, (meth)acrylate, N-vinyl, acrylic acid, methacrylic acid, allyl, acrylamide, acrylonitrile, etc. The comonomer can be mono- or multifunctional with respect to the unsaturated moiety, and where multifunctional, the unsaturated moieties need not be of identical chemistry.

One class of comonomer found to be useful in the polymerizable composition is the class of (meth)acrylate-functional monomers having an index of refraction of at least about 1.5. Such (meth)acrylate functional comonomers can have a structure within the general formula:

(8)

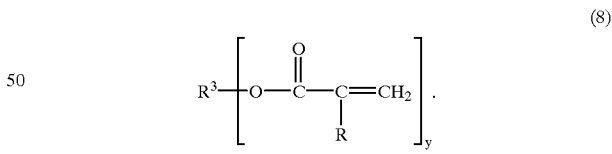

In formula 8, R can be hydrogen (—H) or methyl (—CH$_3$), y is preferably from about 1 to 6, and R$^3$ can be of any chemical structure that allows polymerization of the comonomer via the unsaturated moiety or moieties, and preferably provides a comonomer having an index of refraction of at least 1.50. Preferably, to achieve a sufficiently high index of refraction, R$^3$ can include one or more chemical moieties known in the optical products art as providing optical activity such as an aromatic moiety, cyclohexyl, a halogen such as chlorine, bromine, or iodine, or a sulfur containing group. Further, however, the R$^3$ group can optionally comprise one or more other chemical moieties or structures, for example oxyalkylene, urethane, epoxy, alkyl, and/or allyl groups, etc., any of which can be straight, branched, cyclic, or unsaturated.

Examples of specific useful (meth)acrylate-functional comonomers include a number of commercially available mono-, and multi-functional (meth)acrylate monomers, including hexa-functional aromatic urethane acrylate oligomer available from UCB Radcure Inc., under the designation EB 220, and 2-phenoxyethyl acrylate, sold under the name Photomer 4035 by Henkel Corp., of Ambler Pa., among others. The above-listed (meth)acrylate-functional comonomers are not halogenated. Particularly preferred polymerizable compositions of the present invention comprise the above-identified Brominated Monomer, and further comprise comonomer comprising a halogenated (i.e., brominated, iodinated, or chlorinated) aromatic (meth) acrylate comonomer. Examples of such halogenated monomers include tribromophenoxy acrylate, tribromo phenyl acrylate, tetrabromobisphenol A diacrylate, ethoxylated tetrabromobisphenol A diacrylate, pentabromophenylacrylate, tetrabromo xylyl diacrylate, 2-(2,4,6-tribromophenyl)-1-ethanol acrylic ester, sold as BR-31 (CAS #7347-19-5) by Dai-Ichi Kogyo Seiyaka Co. of Japan, and brominated epoxy diacrylate manufactured by UCB Chemicals Corp., Radcure, in Smyrna, Georgia, under the designation RDX 51027. Some of these monomers are crystalline solids at room temperature. Especially preferred monomers are those that exist as low viscosity liquids at room temperature.

Another preferred comonomer is methyl styrene, having the formula:

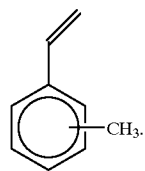

(9)

Methyl styrene exists and is useful in the polymerizable composition as any of various isomeric structures, including ortho-, meta- and para- isomers. Methyl styrene is commercially available as a mixture of one or more of these isomers. For example, methyl styrene can be used and is commercially available in ratios of 80:20, 70:30, 60:40, 55:45, and 5:90 (meta:para):

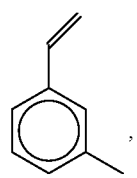

(10)

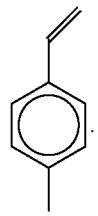

(11)

Methyl styrene is commercially available from Monomer-Polymer & Dajac Laboratory in Feasterville, Pa. Alternatively, methyl styrene can be prepared by methods known in the chemical art; see the Encyclopedia of Polymer Science and Engineering, volume 16, p. 13, ($2^{nd}$ ed. 1985).

The use of methyl styrene as a high index of refraction monomer for the production of optical products is described in Assignee's copending United States patent application entitled "Methyl Styrene as a High Index of Refraction Monomer," having U.S. Pat. No. 6,107,364 filed on even date herewith, and incorporated herein by reference.

The particular comonomers included in any given polymerizable composition, their molecular weight or molecular weights, and the amounts of each, can be chosen according to factors such as the desired nature and properties of the polymerizable composition, and the desired properties of the polymer or polymeric material to be prepared therefrom (e.g., index of refraction, glass transition temperature, melting point, viscosity, etc., of the polymerizable composition or polymeric material).

The amount of the Brominated Monomer present in the polymerizable composition can be any amount that will allow the production of a polymer or polymeric material having desired optical and mechanical properties. For example, and while amounts outside of this range can also be useful, it can be preferred to use from about 5 to 50 parts by weight, more preferably from about 25 to 40 parts by weight Brominated Monomer, based on 100 parts by weight of the polymerizable composition.

The comonomer can also be present in the polymerizable composition in any useful amount. For instance, the comonomer can be present in an amount in the range from about 50 to 95 parts by weight, more preferably from about 60 to 75 parts by weight, based on 100 parts polymerizable composition.

The comonomer can comprise one or a combination of one or more comonomers or high index of refraction comonomers. For instance, the comonomer can comprise a mixture of one or more (meth)acrylate monomers (including mono-, and/or multifunctional monomers), the comonomer can comprise this type of mixture and can further comprise methyl styrene, or, the comonomer can comprise either of the above-described mixtures, and can further include an aromatic (meth)acrylate monomer (e.g., a brominated aromatic (meth)acrylate monomer). In a particularly preferred embodiment, the polymerizable composition comprises from about 25 to 40 parts by weight of the Brominated Monomer, from about 5 to 15 parts by weight methyl styrene monomer, and from about 45 to 70 parts by weight of one or a combination of (meth)acrylate monomers, such as, optionally and preferably, one or more brominated aromatic (meth)acrylate monomers.

As stated above, the composition of the invention is polymerizable. Polymerization can be accomplished by usual means, such as heating in the presence of a free-radical initiator, irradiation with electromagnetic radiation such as ultraviolet or visible light in the presence of suitable photoinitiators, and by electron beam. For reasons of convenience and production speed, the preferred method of polymerization is by irradiation with ultraviolet or visible light in the presence of photoinitiator. Examples of photoinitiators that are useful in the polymerizable composition include, but are not limited to, those commercially available from Ciba Geigy of Tarrytown, N.Y. under the trade designations Darocur 1173, Darocur 4265, Irgacure 651, Irgacure 1800, Irgacure 369, Irgacure 1700, and Irgacure 184, and Irgacure 907. Photoinitiators containing phosphine oxide derivatives are preferred. A preferred photoinitiator is Lucirin® TPO, (2,4,6-trimethylbenzoy) diphenyl phosphine oxide, commercially available from BASF of Charlotte N.C. The photoinitiator can preferably be present in amounts in the range from about 0.1–10 parts by weight per 100 parts by weight of polymerizable composition (pph).

The polymerizable composition can also contain one or more other useful ingredients that, as will be appreciated by those skilled in the polymer art, can be useful in such a polymerizable composition. For example, the polymerizable composition might contain a crosslinking agent, one or more surfactants, pigments, fillers, polymerization inhibitors or other ingredients that can be useful within a polymerizable composition or an optical product. Such ingredients can be included in the composition in amounts known to be effective for their respective purposes.

A crosslinking agent can be useful to increase the glass transition temperature of the polymer resulting from crosslinking the polymerizable composition. Glass transition temperature of a composition can be measured by methods known in the art, such as Differential Scanning Calorimetry (DSC), modulated DSC (MDSC), or Dynamic Mechanical Analysis (DMA). Illustrative examples of suitable crosslinking agents include diallyl phthalate, diallyl terephthalate, 1,3,5-tri-(2-(meth)acryloxyethyl)-s-triazine, and crosslinkers that are commercially available as, e.g., EB 220 (UCB-Radcure of Smyrna Ga.), Ebercryl 3603 (Acrylated epoxy novolac from UCB-Radcure), Ebercryl 693, CN112C60 (Sartomer), Ebercryl 6602 (trifunctional aromatic urethane acrylate).

Surfactants such as fluorosurfactants can be included in the polymerizable composition to reduce surface tension, improve wetting, allow smoother coating and fewer defects of the coating, etc. Specific examples of useful surfactants include nonionic fluorosurfactants sold by the 3M Company of St. Paul, Minn. under the trade names FC-430, FC-171, and FC-740. Such surfactants can be included in the polymerizable composition, e.g., in an amount in the range from about 0.01 to 0.3 parts by weight per 100 parts of polymerizable composition.

Polymeric beads, inorganic fillers, and/or pigments can be added to the polymerizable composition in order to improve processing, to impart slip and scratch resistance to the polymerized material, or to affect optical properties of the polymerized material. Examples of useful polymeric beads include those made of polystyrene, polyacrylates, copolymers of styrene and acrylates, polyethylene, polypropylene, polytetrafluoroethylene, or combinations thereof Examples of inorganic fillers and pigments include solid or hollow glass beads, silica, zirconia, aluminum trihydroxide, and titanium dioxide. The mean particle size can be between 1 and 20 micrometer (um), and the particles can be included in the polymerizable composition in an amount in the range from about 0.25 to 7 weight percent, more preferably from about 0.25 to 2 weight percent.

The polymerizable composition can be formed into any of various known and useful high index of refraction, optical products or articles. These articles can be used in numerous applications where it is desired to efficiently control the flow and intensity of light, for example to produce optical lenses, optical films such as high index of refraction films (e.g., those referred to as Brightness Enhancement Films, including multilayer films and films containing one or more microreplicated layers). The production of optical products from high index of refraction, polymerizable materials, is described, for example, in U.S. Pat. Nos. 5,175,030, 5,183, 597, and 5,591,527, the disclosures of which are incorporated herein by reference.

The invention will be more fully appreciated with reference to the following non-limiting examples in which the reaction components are given as grams used, or weight percents (wt %) based on the total weight of the polymerizable composition. Dimensions in English units are nominal and conversion to metric units is approximate.

EXAMPLE

Preparation of 4,6-dibromo-2-sec-butyl phenol (DBsBP)

In an appropriately sized round bottom flask equipped with a mechanical stirrer, condenser, nitrogen cap, addition funnel, and temperature probe, 850 grams (g) of 2-sec-butylphenol was mixed with 5097 g of deionized water. The mixture was stirred with a mechanical mixer and purged with nitrogen for about 10 minutes. 1881 g bromine was added to the mixture drop-wise using the addition funnel. The reaction temperature was maintained at about 30° C. or less using an ice bath. Following the addition of the bromine the reaction mixture was stirred for 30 minutes at room temperature. Reaction completion was determined by gas chromatography (GC) by monitoring the disappearance of the reactants and monobrominated species.

Upon completion of the reaction, 4487 g of ethyl acetate was added. The mixture was stirred for 15 minutes and then allowed to phase split. The bottom (aqueous) layer was removed and 750.5 g of a 13% (w/w) aqueous sodium hydrosulfite solution was added. The mixture was stirred well and then allowed to phase split. The bottom (aqueous) layer was removed and 856.4 g of a 13% (w/w) aqueous sodium chloride solution was added. The mixture was stirred well and then allowed to phase split. The bottom (aqueous) layer was removed and solvent was stripped from the top layer using a rotary evaporator.

The crude product was then distilled using a distillation head and vigeraux column. The product distills at 0.1 mm Hg, a pot temperature of 151° C. and a head temperature of 97° C. This procedure provided approximately 1500 g DBsBP.

Preparation of 4,6-dibromo-2-isopropyl phenol (DBiPP)

The procedure described for the preparation of DBsBP was followed using 800 g of 2-isopropylphenol instead of the 2-sec-butylphenol, 5291 g of water, 1953 g of bromine, 4658 g of ethyl acetate, 780 g of 13% (w/w) aqueous sodium hydrosulfite and 890 g of 13% (w/w) aqueous sodium chloride to produce 1598 g of DBiPP.

Synthesis of 4,6-dibromo-2-sec-butyl phenyl acrylate (DBsBPA)

In an appropriately sized round bottom flask equipped with a mechanical stirrer, condenser, addition funnel and temperature probe, 140 g of 4,6-dibromo-2-sec-butyl phenol, 360 g of t-butyl methyl ether, 55.2 g of triethyl amine, and 0.02 g phenothiazine were mixed. (In these examples, the base used was triethyl amine; however, a stoichiometrically equivalent amount of any other appropriate bases could also be used, such as sodium hydroxide or pyridine, among others). 47.3 g of acryloyl chloride was added drop wise and, using an ice bath, the reaction temperature was maintain below 20° C. The reaction was run to completion in approximately 30 minutes.

The product was then worked up by sequential washings with deionized water (257 g); 0.7% (w/w) aqueous hydrochloric acid (51 g); 16% (w/w) aqueous sodium carbonate (59.6 g); and 8% (w/w) aqueous sodium chloride (54.5 g). Solvent was removed using a rotary evaporator and the crude product was vacuum distilled to yield 155 grams (94%) of product.

Synthesis of 4,6-dibromo-2-isopropyl phenyl acrylate (DBiPPA)

A procedure similar to that describe in the synthesis of DBsBPA was used to prepare 4,6-dibromo-2-isopropyl phenyl acrylate, however, 4,6-dibromo-2-isopropyl phenol was used in place of 4,6-dibromo-2-sec-butyl phenol.

Synthesis of 2,6-dibromo-4-nonyl phenyl acrylate (DBNPA)

In an appropriately sized round bottom flask equipped with a mechanical stirrer, condenser, nitrogen cap, addition funnel and temperature probe, 44 g of 4-nonylphenol and 180 g of deionized water were mixed. To this stirred mixture, 77.4 g of bromine was added dropwise being careful to keep the reaction temperature below 30° C. After the addition of the bromine, the mixture was allowed to react for about an hour. Once the reaction was complete, as determined by gas chromatography, the product was taken up into an organic phase of 160 g ethyl acetate. The organic phase was then washed with sequential washings of 13% aqueous sodium hydrosulfite (26.5 g) and 13% aqueous sodium chloride (30.2 g). The ethyl acetate was then stripped on a rotary evaporator and the crude product vacuum distilled using a short vigeraux column to yield approximately 66 g 2,6-dibromo-4-nonylphenol (DBNP).

In an appropriately sized round bottom flask equipped with a mechanical stirrer, condenser addition funnel, and temperature probe, 30.5 g of 2,6-dibromo-4-nonylphenol, 64 g of t-butyl methyl ether, 9.8 g of triethylamine, and 0.005 g of phenothiazine were mixed. To this stirred mixture, 8.4 g of acryloyl chloride was added over a period of 30 minutes being careful to keep the reaction temperature below 35° C. After the addition of the acryloyl chloride, the mixture was allowed to react at room temperature (approximately 25° C.) for a period of 2 hours at which point gas chromatography analysis indicated a complete conversion of the 2,6 dibromo-4-nonylphenol to 2,6-dibromo-4-nonyl phenyl acrylate (DBNPA). The product was then worked up with sequential washings of deionized water (45.6 g); 0.7% (w/w) aqueous hydrochloric acid (8.9 g); 16.4% (w/w) aqueous sodium carbonate (10.4 g) and 8.7% (w/w) aqueous sodium chloride (9.5 g). The organic layer was then dried over magnesium sulfate and the solvent stripped in vacuum to yield approximately 32 g of 2,6-dibromo-4-nonyl phenyl acrylate.

Measurement of Refractive Index

The refractive index of resin compositions and cured films were measured using an Abbe Refractometer, made by Erma Inc., of Tokyo Japan, and distributed by Fisher Scientific.

Measurement of Viscosity

The viscosity of uncured resin compositions were made using a Brookfield Model LV viscometer set at 30 RPM and using a #3 spindle.

Examples 1–8 and Comparative Example 1

Preparation of Polymerizable Compositions

Polymerizable compositions were prepared by blending the components in the amounts shown in Table 1. The values for the monomers/oligomers are the weight percent (wt %) of the component based on the total weight of monomers and oligomers in the composition. The values for the surfactant, FC430, and initiator, Lucirin® TPO, are the parts per hundred parts of the polymerizable components (i.e., the monomers and oligomers).

The general procedure which was followed in the preparation of these compositions included first charging into a single pot the RDX51027, PEA, and BR31 (comparative example 1) and then heating at 100° C. until melted, followed by mixing. The methyl styrene, (meth)acrylate monomers, and EB220 were then consecutively blended into the above mixture. The FC430 and TPO were then mixed in for at least 15 minutes. The mixture was then heated in an oven at 6070° C. for 30 to 60 minutes.

TABLE 1

Polymer Compositions (wt %)

| Example | DBiPPA | DBsBPA | DBNPA | Methyl Styrene | RDX 51027 | EB220 | BR31 | PEA | FC-430 (pph) | TPO (pph) |
|---|---|---|---|---|---|---|---|---|---|---|
| Comp. Ex. 1 | | | | | 30.0 | 20.0 | 37.5 | 12.5 | 0.3 | 1.0* |
| 1 | 15.0 | 11.0 | | 10.0 | 52.0 | 3.0 | | 9.0 | 0.3 | 3.0 |
| 2 | 25.0 | | | 10.0 | 55.0 | 5.5 | | 4.5 | 0.3 | 3.0 |
| 3 | | 25.0 | | 11.0 | 52.0 | 3.0 | | 9.0 | 0.3 | 3.0 |
| 4 | | 39.5 | | 10.0 | 45.0 | 5.5 | | | 0.3 | 3.0 |
| 5 | | | 25.0 | 11.0 | 52.0 | 3.0 | | 9.0 | 0.3 | 3.0 |
| 6 | | 25.0 | | | 50.0 | 3.0 | | 22.0 | 0.3 | 3.0 |
| 7 | 30.0 | | | | 48.0 | 3.0 | | 19.0 | 0.3 | 3.0 |
| 8 | | 20.0 | | | 50.0 | 3.0 | | 27.0 | 0.3 | 3.0 |

*In Comparative Example 1, 1.0 pph Darocure 1173 was used instead of 3.0 pph TPO.

Measurement of Refractive Index of a Polymerized Composition

A liquid polymerizable composition was placed between two pieces of unprimed PET film and moved through a knife coater. The two pieces of PET film with the liquid composition between were passed under UV lamps at a conveyor speed of 20 feet per minute. The cured composition was approximately 3 mil thick. A thin layer (approximately 0.05 mm) of bromonaphthalene (index of refraction=1.6582), was placed on the prism of an Abbe Refractometer. A piece of 10 mm×25 mm cured composition was place on top of the bromonaphthalene. Incident light was reflected onto the sample by a reflective prism, and the Refractive Index of the cured composition sample was read. Data are given below.

TABLE 2

Physical Properties of Polymerizable Compositions

| Example | Refractive Index of unpolymerized composition | Viscosity of unpolymerized composition (cps @ 23° C.) | Refractive Index of polymerized composition |
| --- | --- | --- | --- |
| Comp. Ex. 1 | 1.5592 | solid | 1.5890 |
| 1 | 1.5745 | 2760 | 1.5975 |
| 2 | 1.5755 | 6400 | 1.5945 |
| 3 | 1.5740 | 2400 | 1.5936 |
| 4 | 1.5730 | 3800 | 1.5951 |
| 5 | 1.5675 | 3800 | 1.5892 |
| 6 | 1.5665 | 7400 | 1.5919 |
| 7 | 1.5685 | 9200 | 1.5944 |
| 8 | 1.5640 | 4600 | 1.5912 |

The data in Table 2 shows that the compositions of the invention have a higher refractive index and a viscosity more suitable to coating operations than that of the comparative example.

What is claimed is:

1. A polymerizable composition comprising:
    an alkyl-substituted brominated phenolic ester (meth)acrylate monomer selected from the group consisting of 4,6-dibromo-2-sec-butyl phenyl acrylate, 4,6-dibromo-2-tert-butyl phenyl acrylate, and 4,6-dibromo-2-isopropyl phenyl acrylate; and
    at least one aromatic (meth)acrylate comonomer, different from the brominated phenolic ester (meth)acrylate monomer, having an index of refraction greater than about 1.50.

2. A polymerizable composition comprising:
    an alkyl-substituted brominated phenolic ester (meth)acrylate monomer selected from the group consisting of 4,6-dibromo-2-sec-butyl phenyl acrylate, 4,6-dibromo-2-tert-butyl phenyl acrylate, and 4,6-dibromo-2-isopropyl phenyl acrylate; and
    at least one aromatic methacrylate comonomer, different from the brominated phenolic ester (meth)acrylate monomer;
    wherein the composition has a refractive index of at least about 1.56.

3. A polymeric material comprising monomeric units derived from ingredients comprising:
    an alkyl-substituted brominated phenolic ester (meth)acrylate monomer selected from the group consisting of 4,6-dibromo-2-sec-butyl phenyl acrylate, 4,6-dibromo-2-tert-butyl phenyl acrylate, and 4,6-dibromo-2-isopropyl phenyl acrylate; and
    at least one aromatic (meth)acrylate comonomer, different from the brominated phenolic ester (meth)acrylate monomer, having an index of refraction greater than about 1.50.

4. A polymeric material comprising monomeric units derived from ingredients comprising:
    an alkyl-substituted brominated phenolic ester (meth)acrylate monomer is selected from the group consisting of 4,6-dibromo-2-sec-butyl phenyl acrylate, 4,6-dibromo-2-tert-butyl phenyl acrylate, and 4,6-dibromo-2-isopropyl phenyl acrylate; and
    at least one aromatic methacrylate comonomer, different from the brominated phenolic ester (meth)acrylate monomer; wherein the composition has a refractive index of at least about 1.56.

* * * * *